Figure 7:
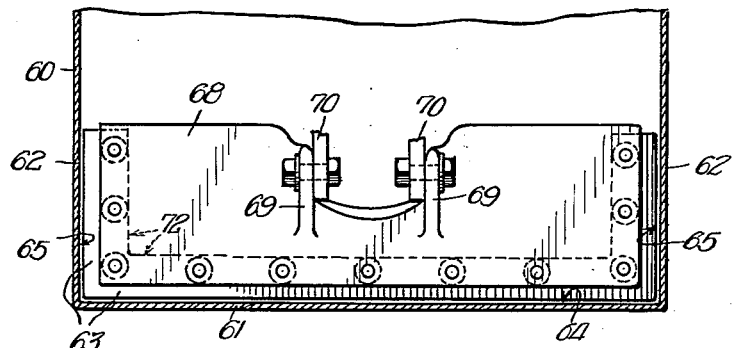

Nov. 19, 1963     A. R. GEBERIN     3,111,216
CONVEYOR FLIGHT
Filed May 23, 1961     2 Sheets-Sheet 1
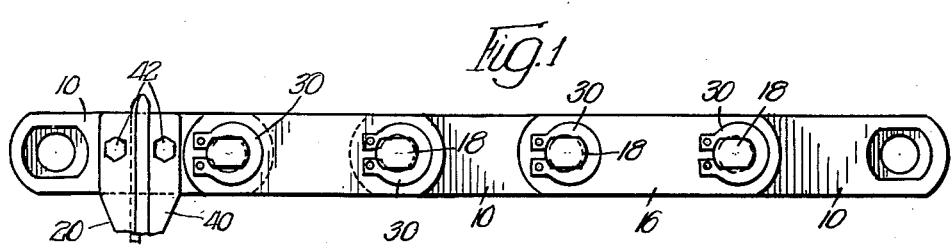
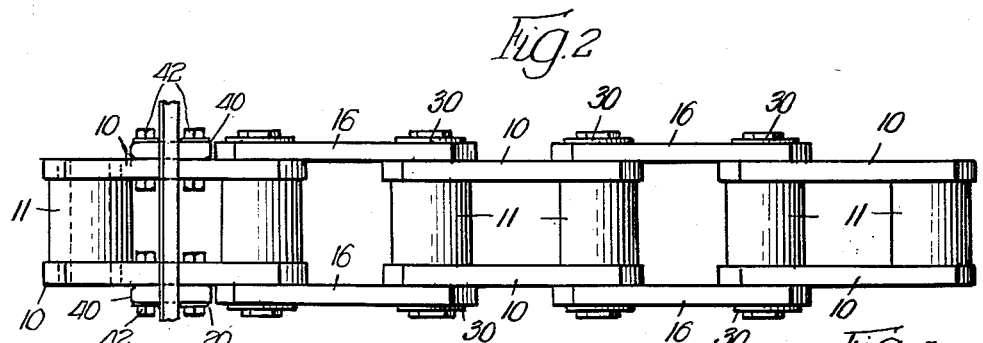
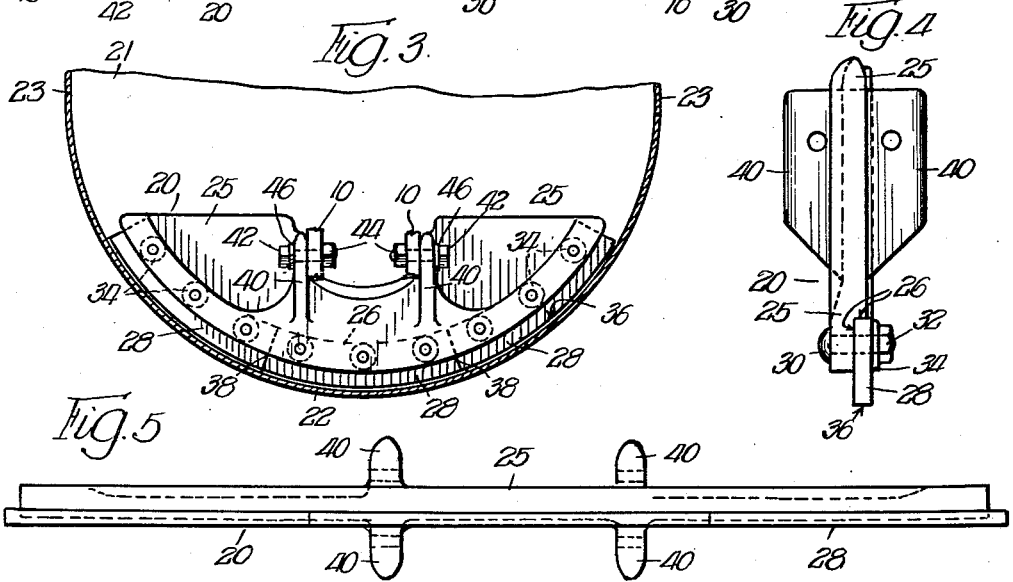
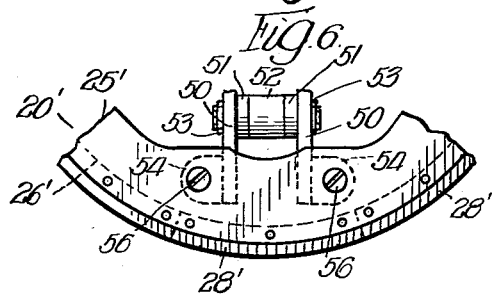
INVENTOR.
Arthur R. Geberin,
BY Nov. 19, 1963 A. R. GEBERIN 3,111,216
CONVEYOR FLIGHT
Filed May 23, 1961 2 Sheets-Sheet 2

INVENTOR.
Arthur R. Geberin,
BY

United States Patent Office 3,111,216
Patented Nov. 19, 1963

3,111,216
CONVEYOR FLIGHT
Arthur R. Geberin, Hammond, Ind., assignor to Screw Conveyor Corporation, Hammond, Ind., a corporation of Illinois
Filed May 23, 1961, Ser. No. 112,018
3 Claims. (Cl. 198—174)

This invention relates, in general, to conveying apparatus, and has particular relation to an improved conveyor flight for endless chain or belt type conveyors suitable, for example, for horizontal and inclined conveying of grain, flour, seeds, chemicals, coffee, starch, sugar, salt, fertilizers, aggregates and other material.

In general, such conveyors comprise an endless power driven chain, belt or the like, with attached flights and with the lower run of the chain or belt and the attached flights operating in the bottom of a conveyor trough to move or convey the material along the bottom of the trough horizontally or at an incline.

While the particular flight which I shall describe hereinafter in connection with the drawings is a flight adapted for use, for example, in conveying apparatus, in general, of the type disclosed in the copending application of Edward P. Escher, Serial No. 849,306, filed October 28, 1959, now Patent No. 3,047,128, it is to be understood that the flights of the present invention may be employed in all similar apparatus and for all similar work.

Certain prior flights have had the objection of unduly wearing off or being defaced or ripped along their edges presented to the bottom of the conveyor trough in the continuous operation of the conveyor. Prior metal flights have also been subject to breaking, and have not had the desired strength, or other desired properties.

The chief advantage of my present invention is in the provision of an improved conveyor flight which will not unduly wear off or be defaced or ripped along its edge presented to the bottom of the conveyor trough in the continuous operation of the conveyor.

The improved flight of the present application is not subject to breaking as are flights of steel or other metal, and has the desired strength for the intended purpose.

Moreover, the improved flight of the present invention has a marginal or edge portion presented to the bottom of the conveyor trough which is relatively inert or neutral to the material with which it cooperates and which it moves or conveys along the bottom of the conveyor trough.

The specific concept of the present invention resides in the provision of conveyor flight comprising a main body portion composed of high tensile strength cast aluminum alloy known as "Amalloy" having a recess along its outer edge, and inserts composed of nylon removably secured in place in the recess with the inserts projecting outwardly from the outer edge of the body portion and presenting a nylon outer edge to the bottom of the conveyor trough.

The nylon outer edge of the flight as thus provided does not unduly wear off or become effaced or ripped by contact with the bottom of the conveyor trough in the continuous operation of the conveyor. And the marginal nylon portion in combination with the main body portion provides a flight having the desired strength and a flight which will not break or become ripped along the marginal edge of the flight in the continuous operation of the conveyor.

Numerous advantages and adaptations of the invention will be apparent from the following detailed description taken in connection with the accompanying drawings, it being understood that the invention is limited only within the scope of the appended claims and not to the particular embodiments selected for illustration.

Figure 8:
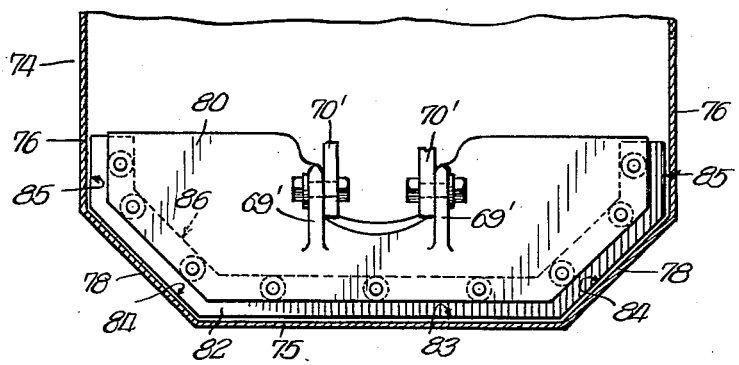
Figure 9:
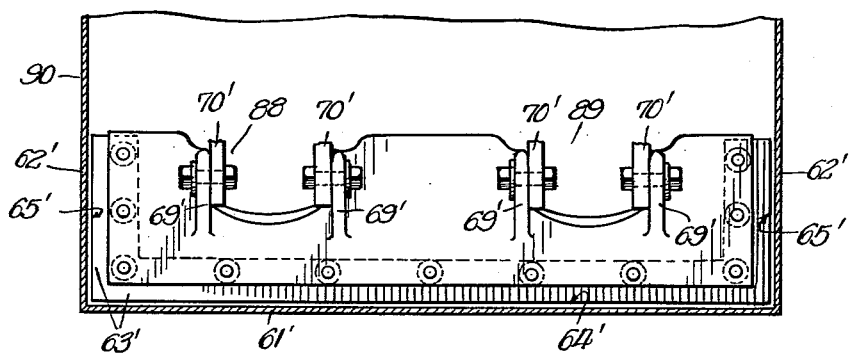

In the drawings:
FIGURE 1 is a fragmentary side elevational view of one suitable form of power transmitting and conveying chain showing a flight embodying the present invention attached thereto;
FIGURE 2 is a top plan view of the chain portion and flight illustrated in FIGURE 1;
FIGURE 3 is a rear view of the flight shown in FIGURES 1 and 2 and showing the bottom portion of the conveyor trough in section;
FIGURE 4 is an end view of the flight looking toward the righthand end of FIGURE 1;
FIGURE 5 is a bottom view of the flight shown in FIGURES 3 and 4;
FIGURE 6 is a fragmentary rear view of a flight embodying the present invention with another form of attachment to the side or attachment bars of the power transmitting and conveying chain;
FIGURES 7 and 8 are views similar to FIGURE 3 showing the bottoms of the conveyor troughs or conveyor housings and the edges or marginal portions of the flights of other configurations; and
FIGURE 9 is a view similar to FIGURES 3, 7 and 8 showing a double chain arrangement.

Referring to the drawings, the power transmitting and conveying chain, as illustrated in FIGURES 1 and 2, is of the type disclosed and claimed in the copending application of Russell B. Maas, Serial No. 109,293, filed May 11, 1961, now Patent No. 3,099,346.

The chain comprises pairs of inner side bars 10—10 of steel or other suitable material and hardened steel tubular bushings 11 having opposite ends locked against rotation in the bars 10.

Outer side bars, as exemplified by the outer side bars 16—16, are disposed over the outer sides of the inner side bars 10—10.

Pins 18, preferably hardened alloy steel pins, although this and the other features above described may vary, are inserted through openings in the bushings 11 and have opposite ends extending through holes in the bars 16—16 and locked against rotation therein.

Metallic split snap rings 30 are removably engaged in grooves at both ends of each pin 18 and hug the outer sides of the bars 16. The snap rings 30 retain the arms 16—16 in place on the ends of the pins 18 with the arms 10 between the arms 16—16 and the cylindrical portions of the bushings 11 between the arms 10—10.

In use, the chain may be trained, for example, about cast tooth sprockets and traction wheels, not shown.

The chain selected for illustration is illustrative, and it is to be understood that the chain may be of any other suitable form. The chain illustrated is a Class S steel side bar chain, but the chain may, for example, be a Class C combination chain, or a detachable malleable chain, or a roller chain, or a chain of any other suitable form.

The endless power driven chain and the attached flights, one of which is shown at 20, operate in the bottom of the conveyor trough 21 to move or convey the material along the trough either horizontally or at an incline.

The conveyor trough 21 has a bottom 22 and spaced upright sides 23—23. In FIGURE 3 the trough bottom 22, or the bottom of the conveyor housing is shown as rounded transversely.

The conveyor flight 20 comprises a main generally arcuate body portion 25 which according to the preferred form of the invention is composed of high tensile strength cast aluminum alloy known as "Amalloy." The rounded outer margin of the main body portion 25 is notched or indented on one side to form a marginal generally arcuate recess 26.

While high tensile strength cast aluminum alloy known as "Amalloy" is referred to above, it is to be understood that within the broader aspects of the invention the main body portion of the flight may be formed of cast iron, manganese bronze, or any other suitable metal or alloy.

Three generally arcuate inserts 28 are positioned end to end in the recess 26 with their ends in abutting relation as shown at 38 in FIGURE 3. The inserts 28, the number of which may vary from the three inserts shown in the drawings, are removably attached to the main body portion 25 by machine screws 30. The shanks of the screws 30 pass through openings in the main body portion 25 and openings in the inserts 28 and engage in nuts 32. Embossed portions 34 may be provided on the inserts 28 beneath the nuts 32.

The inserts 28 project outwardly from the outer rounded edge of the main body portion 25 and have rounded outer edges 36 which fit the contour of the rounded bottom 22 of the conveyor trough 21 and are presented to the inner surface of said rounded bottom 22 of the conveyor trough 21.

The body portion 25 of the flight is shown in FIGURES 1 through 5 as having attachment portions 40—40 which may be formed integral with the body portion 25 and extend laterally from opposite sides of the body portion 25, as shown in FIGURES 3, 4 and 5. These attachment portions fit over, or within if desired, chain bars 10. The attachment portions 40—40 of each flight are attached to the attachment chain bars 10—10 of the power transmitting chain by bolts 42. The shanks of the bolts 42 pass through openings in the attachment portions 40—40 of the flights and in the bars 10—10 and engage in lock nuts 44. Washers 46 may be provided between the attachment portions 40—40 and the heads of the bolts 42.

The flights 20 move with the power transmitting chain and operate longitudinally within the bottom 22 of the conveyor trough, or housing to move the material within the trough, or housing longitudinally along the bottom thereof.

The inserts 28 according to the present invention are preferably composed of a plastic material which will not unduly wear off or be defaced or ripped along its edge 36 presented to the inner surface of the bottom 22 of the conveyor trough 21, or housing in the continuous operation of the conveyor. More particularly, the inserts 28 are composed of Du Pont nylon and preferably Du Pont Nylon No. 103. Inserts or flight edges of this material will move along the inner surface of the bottom 22 of the conveyor trough in a continuous operation of the conveyor without wearing off or becoming defaced or ripped. Moreover, inserts or flight edges of this material may be used for conveying cooked or heated materials and can run in continuous operation of the conveyor up to temperatures of about 200° F.

The inserts or flight edges composed of the material as above described are inert or neutral to the material with which they cooperate and which they move or convey along the bottom of the conveyor trough, or housing. And the marginal nylon portion in combination with the main body portion 25 as described, provides a flight having the desired strength for continuous conveying operation.

The structure of the flight edges in the form of a plurality of inserts and the mounting of the inserts 28 in the recess in the outer margin of the main body portion 25 of the flight enables separate removal and replacement of the inserts if that should become desirable.

Nylon is a generic term for any long-chain synthetic polymer amide which has recurring amide groups as an integral part of the main polymer chain, and which is capable of being formed into a filament in which the structural elements are oriented in the direction of the axis.

It is to be understood, however, that the inserts or flight edges are not limited in the broader aspects of the invention to the Du Pont nylon referred to, but the material may be any other material with similar properties, i.e., with regard to toughness, flexibility, low coefficient of friction, and great strength, and which will not be broken or become worn.

In FIGURE 6 the chain side or attachment bars are shown at 50. The inner chain bars are shown at 51. One of the bushings shown at 52 with split snap rings 53 at the opposite ends thereof, as previously described.

In FIGURE 6 the bars 50 have out-turned attachment lugs 54 and the main body portion 25' of the flight 20' is attached to these lugs 54, for example, by machine screws 56 and nuts, not shown. The outer margin of the main body portion 25' is notched or indented as previously described to form a marginal generally arcuate recess 26'. The generally arcuate inserts 28' are positioned end to end in the recess 26' with their ends in abutting relation. The inserts project outwardly from the outer rounded edge of the main body portion 25' as previously described and the inserts are composed of plastic material and more particularly nylon as previously described.

In FIGURE 7, the conveyor trough or housing 60 has a flat bottom 61 and the flat spaced upright sides 62—62 of the trough or housing are at substantially right angles to the flat bottom 61. In this case, the inserts 63 which correspond to the inserts of FIGURES 3, 4 and 5 have a flat bottom edge 64 and flat side edges 65 at substantially right angles to the bottom edge 64 for presentation to the inner surfaces of the bottom 61 and sides 62—62 of the conveyor trough or housing. The main body portion of the flight is indicated at 68 and the attachment portions 69—69 are attached to the chain bars 70—70 as in the preceding embodiments of the invention. The recesses in which the inserts 63 are secured are indicated at 72.

In FIGURE 8 the conveyor trough or housing 74 has a flat bottom portion 75, flat upright sides 76—76 and angular portions 78—78 between the bottom 75—75 and each of the sides 76—76. The main body portion of the flight is indicated at 80 and the inserts 82 have edges 83, 84 and 85 conforming to the bottom 75, angular portions 78—78, and upright sides 76—76 of the conveyor trough or housing. The attachment portions are indicated at 69'—69' and the chain bars are indicated at 70'—70'. The recesses in which the inserts 82 are secured are indicated at 86.

In FIGURE 9 the flight is carried by a double chain arrangement 88—89. The conveyor trough or housing 90 as shown in this embodiment of the invention is of form similar to FIGURE 7 and the parts of the conveyor trough or housing and the inserts are designated by primed (') reference numerals corresponding with those used in FIGURE 7. The attachment portions and chain bars are also designated by primed (') reference numerals corresponding with those used in FIGURE 7, but are duplicated for each of the two chains.

It is to be understood that the double or plural chain arrangement shown in FIGURE 9 may also be employed with conveyor troughs or housings of the forms shown in FIGURES 3 and 8, or with conveyor troughs or housings of any other suitable form.

The embodiments of the invention disclosed in the drawings and the specification are for illustrative purposes only, and it is to be especially understood that said drawings and the specification are not to be construed as a definition of the limits or scope of the invention, reference being had to the appended claims for that purpose.

I claim:
1. A conveyor comprising a conveyor trough having a bottom over the major portion of which material is adapted to be conveyed and spaced upright sides, a conveyor chain operable longitudinally within said trough between the upright sides thereof, a laterally elongated conveyor flight of generally planar form disposed perpendicular to the bottom of said trough over the major portion thereof to its lower edge and attached to the chain with said chain overlying the intermediate portion of said flight, said lower edge of said flight conforming to and spaced from the major portion of the bottom of said trough and having a planar recess in the plane of the perpendicular flight and opening from the lower edge and from one side of the lower edge of said flight, generally planar plastic insert sections positioned end to end in said recess in the perpendicular plane of said flight and projecting from the major portion of the lower edge of said flight, the lower edges of said inserts conforming to and presenting plastic outer edges to the inner surface of the major portion of the bottom of said trough, said plastic inserts having one side of each exposed outwardly over its entire perpendicular extent from the open portion of the recess in said flight, and detachable fastening means having portions passing through openings in said flight and in said plastic inserts and detachable for individual replacement of said inserts.

2. A conveyor according to claim 1, wherein the plastic insert sections are formed of nylon.

3. A conveyor according to claim 1, wherein the plastic insert sections have embossed portions beneath the adjacent portions of the detachable fastening means.

References Cited in the file of this patent

UNITED STATES PATENTS

| | | |
|---|---|---|
| 1,769,336 | Detaint e al. | July 1, 1930 |
| 2,400,502 | Hapman | May 21, 1946 |
| 2,660,310 | Hapman | Nov. 24, 1953 |
| 2,747,725 | Hatch | May 29, 1956 |
| 2,934,199 | Winkler | Apr. 26, 1960 |
| 3,047,128 | Escher | July 31, 1962 |